(12) United States Patent
Anvin et al.

(10) Patent No.: US 7,089,397 B1
(45) Date of Patent: Aug. 8, 2006

(54) METHOD AND SYSTEM FOR CACHING ATTRIBUTE DATA FOR MATCHING ATTRIBUTES WITH PHYSICAL ADDRESSES

(75) Inventors: H. Peter Anvin, San Jose, CA (US); Guillermo J. Rozas, Los Gatos, CA (US); Alexander Klaiber, Mtn. View, CA (US); John P. Banning, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 232 days.

(21) Appl. No.: 10/613,801

(22) Filed: Jul. 3, 2003

(51) Int. Cl.
*G06F 12/00* (2006.01)

(52) U.S. Cl. .......................... 711/207; 711/3; 711/144; 711/154; 711/206

(58) Field of Classification Search ................ 711/207, 711/206, 144, 154, 3
See application file for complete search history.

(56) References Cited

U.S. PATENT DOCUMENTS

| | | | |
|---|---|---|---|
| 5,946,716 A * | 8/1999 | Karp et al. ................. | 711/207 |
| 6,189,074 B1 * | 2/2001 | Pedneau ..................... | 711/139 |
| 6,275,917 B1 * | 8/2001 | Okada ........................ | 711/207 |
| 6,304,944 B1 * | 10/2001 | Pedneau ..................... | 711/139 |
| 6,351,797 B1 * | 2/2002 | Beard ......................... | 711/207 |
| 6,681,311 B1 * | 1/2004 | Gaskins et al. ............. | 711/203 |
| 6,826,670 B1 * | 11/2004 | Middleton et al. .......... | 711/205 |
| 2004/0193831 A1 * | 9/2004 | Moyer ....................... | 711/202 |

* cited by examiner

*Primary Examiner*—Stephen C. Elmore

(57) ABSTRACT

A method for caching attribute data for matching attributes with physical addresses. The method includes storing a plurality of attribute entries in a memory, wherein the memory is configured to provide at least one attribute entry when accessed with a physical address, and wherein the attribute entry provided describes characteristics of the physical address.

17 Claims, 6 Drawing Sheets

400

```
┌─────────────────────────────────┐
│ UPON A TLB MISS, INVOKE A FILL  │
│ ALGORITHM TO OBTAIN A NEW       │
│ PHYSICAL ADDRESS CORRESPONDING  │
│ TO A VIRTUAL ADDRESS            │
│ 401                             │
└─────────────────────────────────┘
                 ↓
┌─────────────────────────────────┐
│ ACCESS AN ATTRIBUTE CACHE TO    │
│ OBTAIN ONE OR MORE ATTRIBUTES   │
│ CORRESPONDING TO THE PHYSICAL   │
│ ADDRESS                         │
│ 402                             │
└─────────────────────────────────┘
                 ↓
           ╱ MISS?  ╲ ──NO──┐
           ╲  403   ╱       │
                 ↓ YES      │
┌─────────────────────────────────┐  │
│ ACCESS LOGIC TO LOOK UP/        │  │
│ COMPUTE ATTRIBUTES FOR THE      │  │
│ PHYSICAL ADDRESS                │  │
│ 404                             │  │
└─────────────────────────────────┘  │
                 ↓                   │
┌─────────────────────────────────┐  │
│ STORE THE ATTRIBUTES AND THE    │  │
│ PHYSICAL ADDRESS WITHIN THE     │  │
│ ATTRIBUTE CACHE AND THE TLB     │  │
│ 405                             │  │
└─────────────────────────────────┘  │
                 ↓                   │
           ╱SPECULATE?╲──NO──────────┤
           ╲   406    ╱              │
                 ↓ YES               │
┌─────────────────────────────────┐  │
│ ACCESS LOGIC TO LOOKUP/COMPUTE  │  │
│ A PLURALITY OF ATTRIBUTES FOR A │  │
│ PLURALITY OF SPECULATIVE PHYSICAL│ │
│ ADDRESSES                       │  │
│ 407                             │  │
└─────────────────────────────────┘  │
                 ↓                   │
            ( CONTINUE ) ←───────────┘
            (   408    )
```

FIGURE 4

METHOD AND SYSTEM FOR CACHING ATTRIBUTE DATA FOR MATCHING ATTRIBUTES WITH PHYSICAL ADDRESSES

TECHNICAL FIELD

The present invention relates generally to digital computer systems. More specifically, the present invention pertains to efficiently implementing translation between virtual addresses and physical addresses of a memory management system.

BACKGROUND ART

Many types of digital computer systems utilize memory caches in order to improve their performance and responsiveness. In typical computer systems, a memory cache typically comprises one or more memory banks that bridge main memory and the CPU. It is faster than main memory and allows instructions to be executed and data to be read at higher speed. The more commonly implemented caches include level 1 caches (e.g., L1), level 2 caches (e.g., L2), and translation look aside buffers (e.g., TLB). Generally, the L1 cache is built into the CPU chip and the L2 cache functions as a secondary staging area that feeds the L1 cache. Increasing the size of the L2 cache may speed up some applications but have no effect on others. The TLB is a cache matching virtual addresses with their corresponding physical address translations. The TLB is typically involved in the execution of most of the applications run on a typical computer system. Modern operating systems maintaining virtual memory make constant use of the TLB as they manage the virtual memory system. Accordingly, it is very important to the performance of the computer system that the data access paths that incorporate the TLB are as thoroughly optimized as possible. Since the TLB often incorporates attribute data in addition to the virtual address to physical address translations, what is required is a solution that can optimize the performance of the TLB with such attribute data in addition to the virtual address to physical address translations.

DISCLOSURE OF THE INVENTION

Embodiments of the present invention provide a method and system for caching attribute data for matching attributes with physical addresses.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 shows a flowchart of the steps of a process for caching physical attributes for use with a TLB in accordance with one embodiment of the present invention.

DETAILED DESCRIPTION OF THE EMBODIMENTS

Figure 1:
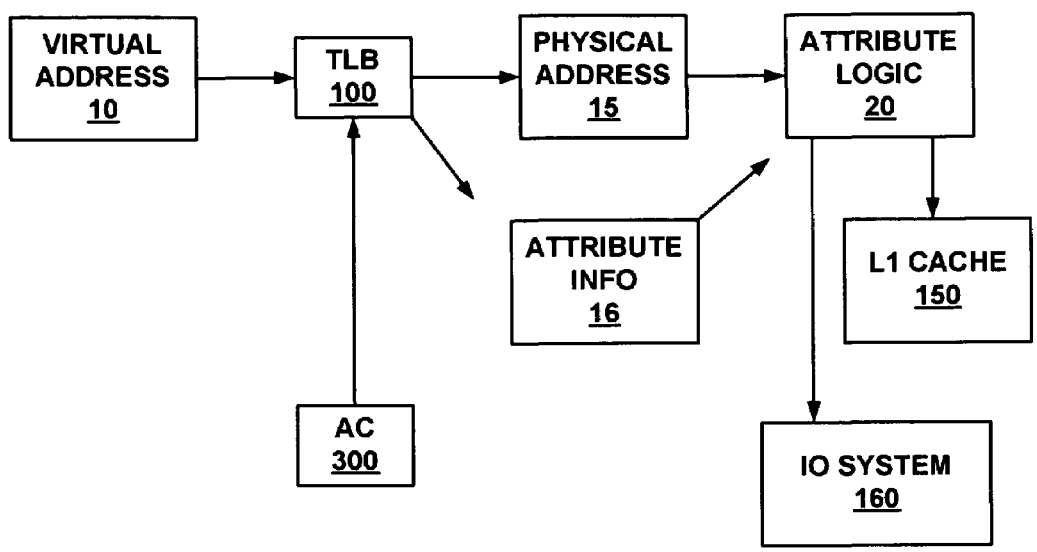
FIG. 1 shows a flow diagram showing the operation of a TLB having a parallel attribute cache within a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement a method and system for caching attribute data for use with matching physical addresses. Embodiments of the present invention can function with, or without, a TLB (translation look aside buffer). When a TLB is included, one method embodiment includes storing a plurality of TLB (translation look aside buffer) entries for the virtual address to physical address translations, wherein the entries include respective attributes. A plurality of attribute entries are stored in a memory (e.g., a cache), wherein the memory is configured to provide an attribute entry when that attribute entry is not stored in the TLB. In this manner, embodiments of the present invention reduce the time penalty incurred on a TLB miss, when a page table must be accessed to obtain a physical address and when CPU cycles must be consumed looking up attributes for that physical address. By caching attributes for physical addresses, an attribute cache in accordance with the present invention can significantly reduce the amount of time required to service a TLB miss. Additional embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "providing" or "retrieving" or "translating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE PRESENT INVENTION

FIG. 1 shows a flow diagram showing the operation of a TLB 100 within a computer system in accordance with one embodiment of the present invention. FIG. 1 shows a virtual address 10 being used to index a TLB 100 to obtain a corresponding physical address 15. The physical address 15 includes a number of attribute bits, or simply attributes, which are used to configure the manner in which the physical address, and/or the data at the physical address, will be handled by the computer system. The attribute bits (e.g., attribute info 16) are typically appended to the physical address 15 and are interpreted by attribute logic 20 which controls handling of the physical address with respect to the data caches, such as the L1 cache 150, and the I/O system 160 of the computer system. In the FIG. 1 embodiment, and attribute cache 300 is shown connected to the TLB 100.

The TLB 100 is used to cache a subset of the translations from a virtual address space to a physical addresses space. As is well known, when a TLB "hit" occurs, the physical address translation is rapidly returned by the TLB since the virtual address-to-physical address translation is stored as an entry in the cache. In addition to caching the physical address, the TLB stores with the physical address a plurality of attributes that are descriptive of the physical address.

The attributes describe different characteristics of the physical address. Such characteristics can include, for example, whether the data associated with the physical address has previously been stored within a cache, e.g. the L1 cache 150, whether the data associated with the physical address is cacheable, whether the physical address is write-protected, whether the data associated with the physical address resides within a disk cache, or whether the physical address has been dirtied by some other machine process, or the like. By being aware of these attributes, the computer system can tailor its response to the physical address and avoid duplication of work or corruption of the data caches. These functions are performed by the attribute logic 20.

The virtual address to physical address translation process is one of the most critical processes that occur within a computer system. It is very important to the overall performance of the computer system that the data path traversed to obtain a physical address from a virtual address be thoroughly optimized and execute as quickly as possible. Accordingly, it is important to minimize the amount of time consumed by the operation of the attribute logic 20 and the handling physical addresses in accordance with their attributes.

In the present embodiment, the attribute cache 300 is implemented as a "parallel" attribute cache. The attribute cache 300 functions by caching recently accessed attributes associated with the physical addresses stored within the TLB 100. The attribute cache 300 is a "parallel" attribute cache because it does not reside on the main data path that traverses the TLB 100, attribute logic 20, and the L1 data cache 150 and I/O system 160. Accordingly, the circuitry comprising the attribute cache 300 does not need to be as meticulously optimized, or as expensively implemented, as the circuitry of the other components that are on the main data path. The operation of the parallel attribute cache 300 is further described in FIG. 3 below.

Figure 2:
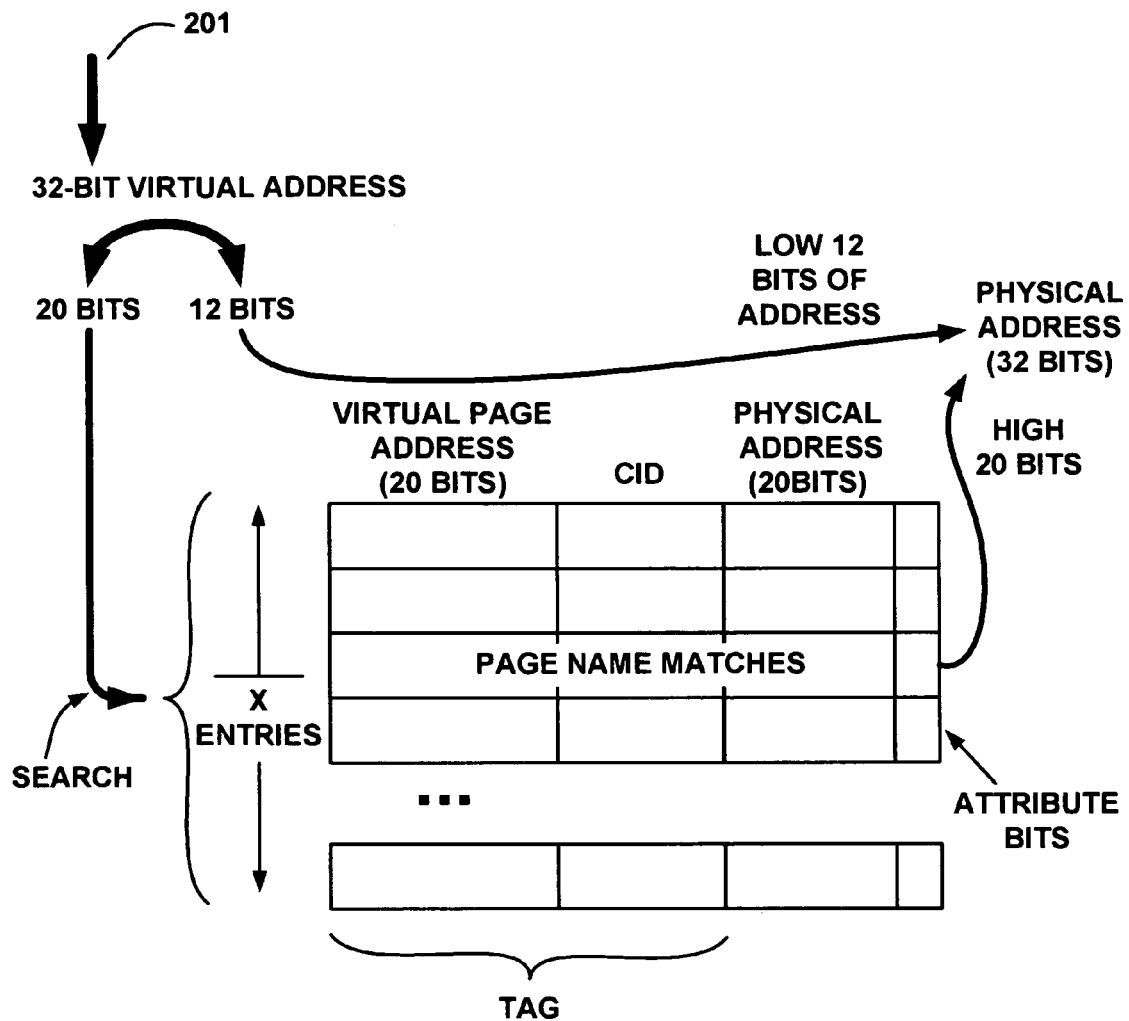
FIG. 2 shows a diagram showing the entries of the TLB in accordance with one embodiment of the present invention.

FIG. 2 shows a diagram of the entries of the TLB 100 in accordance with one embodiment of the present invention. An example wherein 32-bit addresses 201 are used is shown. As depicted in FIG. 2, the size of each page is $2^{12}$ bytes (e.g., the lower 12 bits of an address) and the tag size is 20 bits (e.g., the upper 20 bits of an address) plus the size of, e.g., an optional context identifier (CID). FIG. 2 also depicts attribute bits appended to the end of each entry as shown.

It should be noted that embodiments of the present invention are not limited to any particular 32-bit addressing configuration. For example, embodiments of the present invention are equally applicable to 16-bit, 64-bit, etc. types of addressing configurations. Similarly, although the tags with which the TLB is indexed are shown as being 20 bits in length, embodiments of the present invention are equally applicable to other configurations.

Generally, with virtual addresses comprising incoming 32-bit data words as shown, the most significant 20 bits (e.g., the page name), plus the context identifier, if present, comprise a tag and are used to search the "x" number of entries of the TLB (e.g., 48 entries, 96 entries, or more) for tag matches (e.g., page name matches). The least significant 12 bits of the incoming virtual address indicate which byte of a page is addressed and become the least significant 12 bits of the physical address, as shown. The attribute and other control bits are included together with the 20 bits of the physical address. The output of the TLB is the most significant 20 bits of the physical address, sometimes referred to as the page frame address, plus the attribute and control bits. Generally, the TLB 100 caches the most recent address translations. Thus, TLB misses usually result in the entries of the TLB 100 being updated with the more recent address translations.

Figure 3:
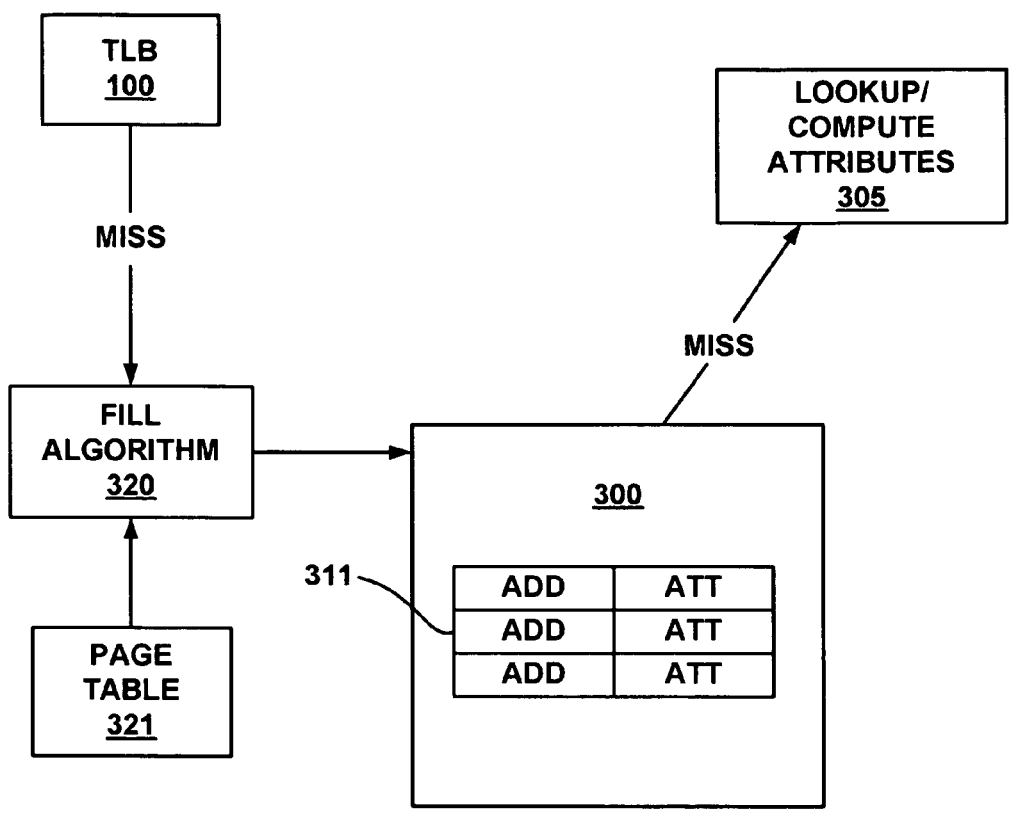
FIG. 3 shows a flow diagram depicting the operation of an attribute cache in accordance with one embodiment of the present invention.

FIG. 3 shows a flow diagram depicting the operation of parallel attribute cache 300 in accordance with one embodiment of the present invention. FIG. 3 depicts the operation of the attribute cache 300 in servicing a TLB miss.

As shown in FIG. 3, when a TLB miss occurs during a virtual address to physical address translation, a software, microcode or hardware algorithm 320, for example a conventional page table walk, is executed to obtain a corresponding physical address. This may involve consulting a page table or other data structure 321.

In the FIG. 3 embodiment, the physical address is used in conjunction with a plurality of attributes that are stored with (e.g., appended to) the physical address. The attribute cache 300 provides some, or all, (e.g., at least one) of these attributes for the physical address. As depicted in FIG. 3, the attribute cache 300 includes a number of entries 311 of physical addresses and their corresponding attributes. In the present embodiment, the attribute cache 300 is indexed with the physical address. Thus, when a physical address is obtained by the fill algorithm 320, instead of consuming CPU cycles looking up the attributes for that address, the attributes can be obtained from the attribute cache 300. These attributes are then returned to the TLB 100 along with the physical address.

Upon the occurrence of an attribute cache miss, the attributes are looked up or computed by the logic unit 305. In this case, the required attribute data does not reside in either the TLB 100 or the attribute cache 300. The attributes are looked up or otherwise computed by the logic 305 and then returned to the attribute cache 300 and the TLB 100 along with the physical address.

Thus, the attribute cache 300 provides a number of advantages for the computer system. Since the attribute cache stores only the attributes along with their corresponding physical addresses, as opposed to entire virtual addresses along with corresponding physical addresses (e.g., as in the TLB), the attribute cache can have a much larger number of entries in comparison to the TLB. This increases the chances that the attribute data will reside in the attribute cache even though the attribute data may have been previously flushed from the TLB. Additionally, since the attribute cache 300 is accessed only on TLB misses, the turnover of entries within the attribute cache 300 is less than that of the TLB. To further increase performance, a designer can configure the attribute cache 300 to cache only those physical attributes of physical addresses which are most time-consuming to obtain. Thus, the physical attributes that cannot be quickly computed would be the most likely candidates for inclusion in the attribute cache 300. Such examples include, a translation bit indicating whether a translation has been performed on a corresponding entry, or a cache status bit indicating a cache status of the corresponding entry, or the like.

Optionally, in one embodiment, the attribute cache 300 is speculatively loaded to anticipate future TLB misses. For example, upon the occurrence of an attribute cache miss, the logic unit 305 can be consulted to lookup/compute the attributes, and then lookup/compute the attributes for a plurality of additional physical addresses. These additional physical addresses have not yet been requested by the TLB, but are speculatively looked up in anticipation of a subsequent TLB access. In this manner, the accurate cache 300 can optionally speculate on subsequent accesses by the TLB in an attempt to reduce the amount of time in obtaining attributes.

Figure 6:
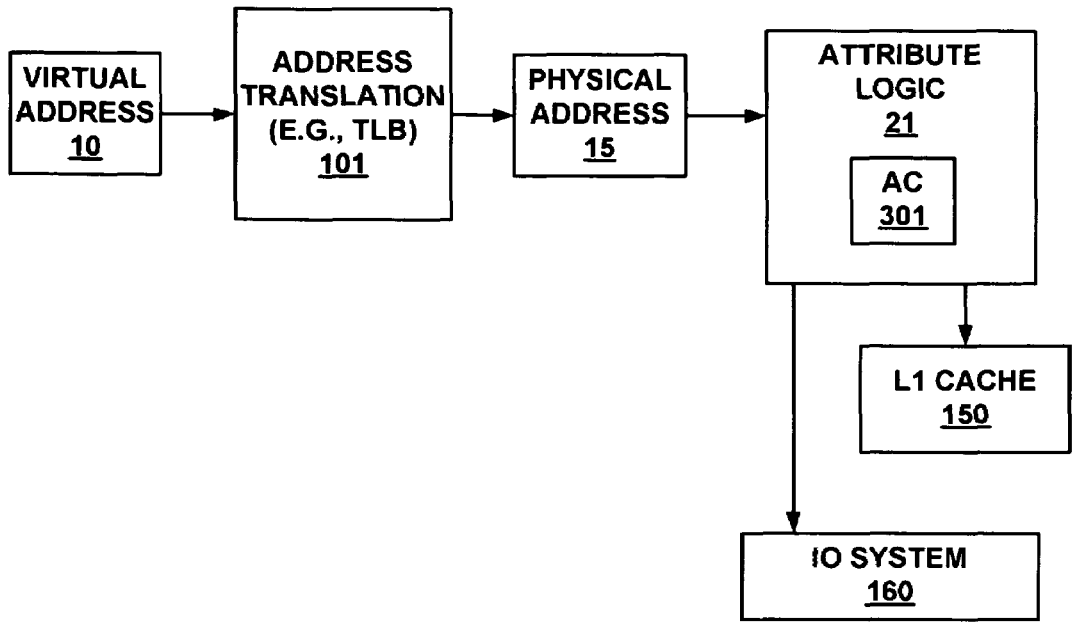
FIG. 6 shows a flow diagram showing the operation of a TLB having a serial attribute cache within a computer system in accordance with one embodiment of the present invention.
Figure 7:
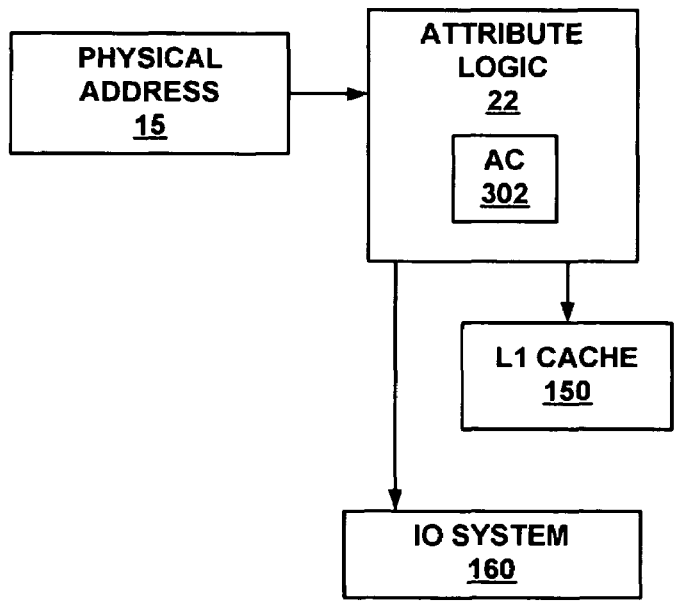
FIG. 7 shows a flow diagram showing the operation of a basic attribute cache within a computer system in accordance with one embodiment of the present invention.

FIG. 6 and FIG. 7 below show diagrams depicting the operation of a "serial" version of an attribute cache and a basic version of an attribute cache in accordance with embodiments of the present invention.

Referring now to FIG. 4, a flowchart of the steps of a process 400 for caching physical attributes for use with a TLB in accordance with one embodiment of the present invention is shown.

Process 400 begins in step 401, where, upon a TLB miss, a fill algorithm 320 is accessed to obtain a new physical address corresponding to a virtual address. In step 402, an attribute cache 300 is accessed to obtain one or more attributes corresponding to the physical address retrieved by the fill algorithm 320. In step 403, in the case of the attribute cache miss, process 400 proceeds to step 404 where logic 305 is accessed to lookup/compute the attributes for the physical address. In step 405, the attributes and the physical address are stored within the attribute cache 300. In an alternate embodiment, the attributes and the physical address are also stored within the TLB 100. In step 406, in the case of speculative loading of the attribute cache, the logic 305 is accessed to lookup/compute a plurality of attributes for a plurality of speculative physical addresses. Subsequently, process 400 continues in step 408.

Computer System Platform

Figure 5:
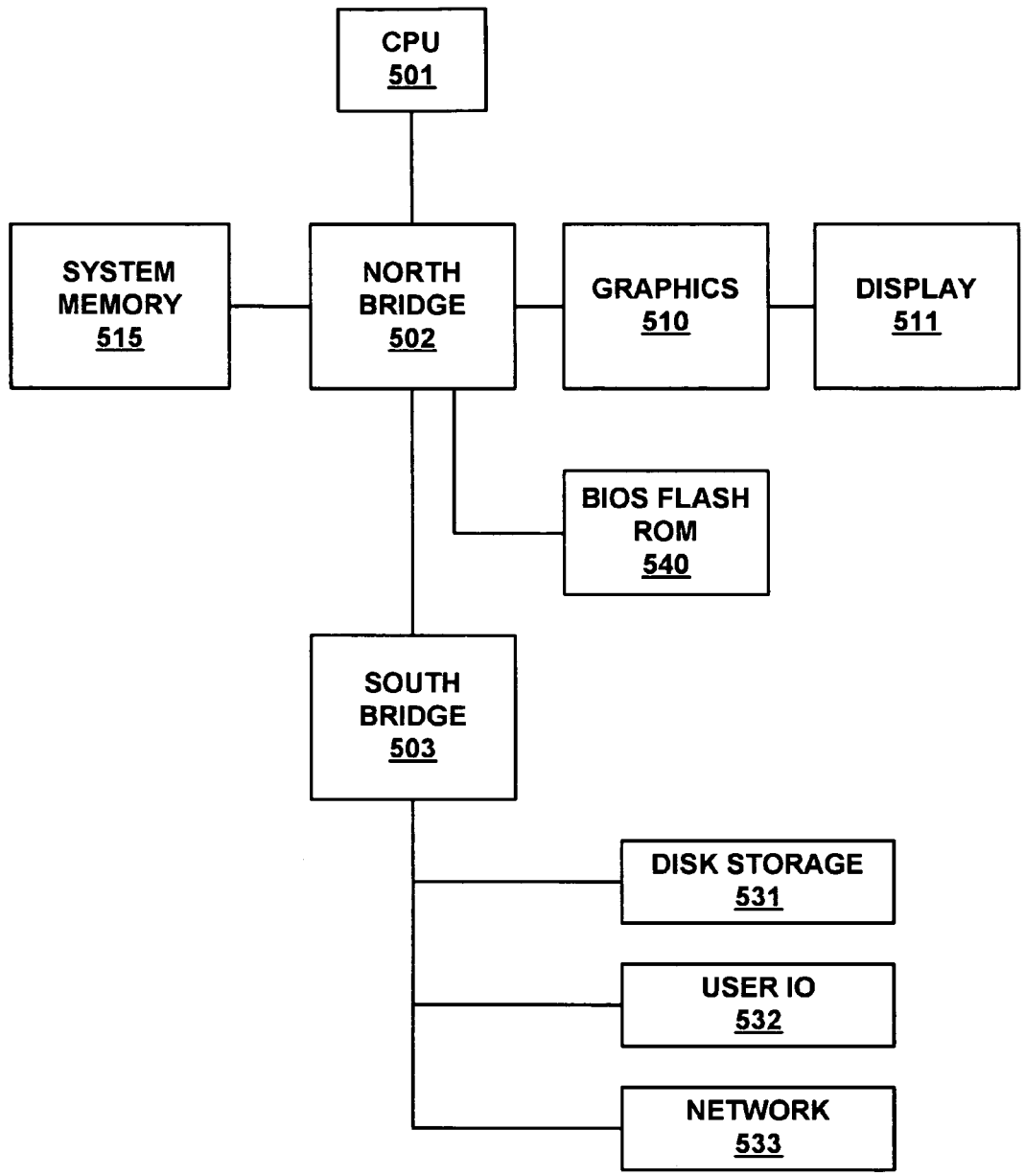
FIG. 5 shows a diagram of a computer system in accordance with one embodiment of the present invention.

With reference now to FIG. 5, a computer system 500 in accordance with one embodiment of the present invention is shown. Computer system 500 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 500) and are executed by the CPU 501 of system 500. When executed, the instructions cause the system 500 to implement the functionality of the present invention as described above.

In general, system 500 comprises at least one CPU 501 coupled to a North bridge 502 and a South bridge 503. The North bridge 502 provides access to system memory 515 and a graphics unit 510 that drives a display 511. The South bridge 503 provides access to a plurality of coupled peripheral devices 531 through 533 as shown. Computer system 500 also shows a BIOS ROM 540 that stores BIOS initialization software.

FIG. 6 shows a diagram depicting the operation of a "serial" version of an attribute cache 301 in accordance with one embodiment of the present invention. As depicted in FIG. 6, in a serial attribute cache implementation, the attribute cache lies within the attribute logic 21 and resides on the main data path of the virtual address to physical address translation process.

In the FIG. 6 embodiment, the circuitry of the attribute cache 301 is optimized such that it can perform and function at the high speeds of the other components on the main data path (e.g., address translation unit 101, attribute logic 21, L1 data cache 150, etc.). The FIG. 6 embodiment provides the advantage that the address translation unit 101 can be a much simpler TLB, or any other type of address translation unit, in comparison to a fully implemented TLB 100 of FIG. 1. In other respects, with respect to caching physical addresses and their matching attributes, the serial attribute cache 301 functions in a manner substantially similar to the parallel attribute cache 300 of FIG. 1. Optionally, other attribute information can be provided to the attribute logic 21, for example a read only permission bit, and the like.

FIG. 7 shows a diagram depicting the operation of a "basic" version of an attribute cache 302 in accordance with one embodiment of the present invention. As depicted in FIG. 7, in a basic attribute cache implementation, there is no address translation unit whatsoever included in the architecture. In the FIG. 7 embodiment, the physical addresses are directly received by the attribute logic 22 which accesses the attribute cache 302 to generate/lookup the attributes for the physical address (e.g., physical address 15). The FIG. 7 embodiment provides an advantage in that it is relatively straightforward and inexpensive to implement. Thus, for example, the basic version of the attribute cache 302 would be well-suited for use in embedded applications that place the premium on low-cost and comparative ease of manufacture. In other respects, with respect to storing physical addresses with their matching attributes, the basic attribute cache 302 functions in a manner substantially similar to parallel attribute cache 300 of FIG. 1.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A system for caching attribute data for use with a translation look aside buffer, comprising:
   a TLB for storing a plurality of TLB (translation look aside buffer) entries for virtual address to physical address translations, wherein the TLB entries include respective attributes; and
   an attribute cache coupled to the TLB, the attribute cache for storing a plurality of attribute entries and for providing a selected attribute entry when the selected attribute entry is not stored in the TLB.

2. The system of claim 1, further comprising:
   a page table for performing an attribute lookup to obtain the selected attribute entry when the selected attribute entry is not stored in the attribute cache.

3. The system of claim 2, wherein the attribute cache is configured to support speculative attribute lookups to obtain a resulting plurality of attribute entries, wherein the plurality of attribute entries are stored into the attribute cache to service a subsequent access when a subsequent attribute is not stored in the TLB.

4. The system of claim 1 wherein the plurality of attribute entries of the attribute cache are indexed with physical addresses.

5. The system of claim 1 wherein at least one attribute entry indicates that the physical page is write-protected.

6. The system of claim 1 wherein at least one attribute entry indicates that data associated with the physical address is cacheable.

7. The system of claim 1 wherein at least one attribute entry indicates that data associated with the physical address is cached in an alternate caching system.

8. A TLB (translation look aside buffer) having an attribute cache for caching attribute data for use with a translation look aside buffer, the TLB storing a plurality of TLB entries for virtual address to physical address translations, wherein the TLB entries include respective attributes, wherein the attribute cache stores a plurality of attribute entries and provides a selected attribute entry when the selected attribute entry is not stored in the TLB.

9. The TLB of claim 8, wherein the TLB is configured to access a page table for performing an attribute lookup to obtain the selected attribute entry when the selected attribute entry is not stored in the attribute cache.

10. The TLB of claim 8, wherein the attribute cache is configured to support speculative attribute lookups to obtain a resulting plurality of attribute entries, wherein the plurality of attribute entries are stored into the attribute cache to service a subsequent access when a subsequent attribute is not stored in the TLB.

11. The TLB of claim 8 wherein the plurality of attribute entries of the attribute cache are indexed with physical addresses.

12. The TLB of claim 8 wherein at least one attribute entry indicates that a physical page is write-protected.

13. The TLB of claim 8 wherein at least one attribute entry indicates that data associated with a physical address is cacheable.

14. The TLB of claim 8 wherein at least one attribute entry indicates data associated with a physical address is cached in an alternate caching system.

15. A computer readable media for caching attribute data for use with a translation look aside buffer, the media storing computer readable code which when executed by a processor causes the processor to implement a method comprising:
   storing a plurality of TLB (translation look aside buffer) entries for the virtual address to physical address translations, wherein the TLB entries include respective attributes; and
   storing a plurality of attribute entries in an attribute cache, the attribute cache configured to provide at least one attribute entry when the attribute entry is not stored in a TLB.

16. The computer readable media of claim 15, wherein the attribute cache is configured to provide an attribute entry when the attribute entry is not stored in the TLB.

17. The computer readable media of claim 15, further comprising:
   performing an attribute lookup to obtain the attribute entry when the attribute is not stored in the attribute cache;
   storing the attribute entry into the TLB; and
   storing the attribute entry into the attribute cache.

* * * * *